United States Patent [19]

Blackmon et al.

[11] Patent Number: 5,589,758
[45] Date of Patent: Dec. 31, 1996

[54] MODULAR, HYBRID POWER SYSTEM

[75] Inventors: James B. Blackmon, Brownsboro, Ala.;
Robert E. Drubka, Huntington Beach,
Calif.; Nelson E. Jones, Los Osos,
Calif.; R. Andrew Gerrick, Santa Ana,
Calif.; Michael L. Hand, Huntington
Beach, Calif.

[73] Assignee: McDonnell Douglas Corporation,
Huntington Beach, Calif.

[21] Appl. No.: 116,852

[22] Filed: Sep. 7, 1993

[51] Int. Cl.$^6$ ........................................... H02P 9/00
[52] U.S. Cl. ............................... 322/100; 322/33; 290/52
[58] Field of Search ............................... 322/2 R; 290/52

[56] References Cited

U.S. PATENT DOCUMENTS

| Re. 30,589 | 4/1981 | Park | 60/652 |
| 4,079,263 | 3/1978 | Inoue | 290/52 |
| 4,386,309 | 5/1983 | Peschka | 322/2 R |
| 4,638,173 | 1/1987 | Milton | 290/52 |
| 4,746,808 | 5/1988 | Kaeser | 290/52 |
| 5,260,640 | 11/1993 | Carabetta et al. | 322/2 R |

OTHER PUBLICATIONS

Electrical Engineering Handbook by R. C. Dorf CRC Press, 1993.

*Primary Examiner*—Steven L. Stephan
*Assistant Examiner*—Nicholas Ponomarenko
*Attorney, Agent, or Firm*—Donald E. Stout; Ronald L. Taylor

[57] ABSTRACT

A power system provides various levels of electrical power at various radio frequencies to specific input locations of a neutral particle beam accelerator system. Both the power system and the accelerator system are mounted on a space platform. The power system includes separate modules mounted on two hinged members of the platform. The modules utilize turbines, generators and fuel cells to provide the needed electrical power which is amplified to the desired levels required by the accelerator system. In addition, a fuel cell is utilized to power a pulse drive motor to drive the generators during turbine start up in order to provide high voltage output power during the start up. A regenerator produces hydrogen and oxygen from the water effluent produced by the fuel cells and the combustors which powers the turbines thereby recycling the fuel and working fluid and consequently making the power system generally non-contaminating and fuel efficient. A thermal management subsystem circulates hydrogen through both the accelerator and power systems, and the hydrogen is utilized as both a coolant and a fuel/working fluid for power production thereby enhancing the energy efficiency of the power system.

16 Claims, 9 Drawing Sheets

MODULAR, HYBRID POWER SYSTEM

The invention relates generally to power systems and, more particularly, to an electrical power system that provides multi-megawatt bursts of electrical power to a neutral particle beam accelerator system mounted on a space platform.

Many space-based systems require a power supply capable of delivering bursts of high power. In addition, such systems typically require that the power supply system produce minimal contaminants and minimal effluents because of the deleterious effects such contaminants and effluents may have on on-board computer systems, sensitive electrical systems, optical systems and other types of systems incorporated therein. In addition, designers of such space systems are cognizant of the adverse effects contamination of the surrounding space environment may produce on other satellites in similar orbits. Consequently, the designers of such space systems have sought to provide energy-producing systems which recycle fuels, working fluids and other chemicals used therein. Where complete containment is impractical, it is desirable that effluents from the power system be limited to hydrogen or other elements which naturally exist in the space environment or which are otherwise deemed harmless. Since a space platform must have its own propulsion system so that it can maintain its orbit for a desired period of time and must also produce enough energy for housekeeping needs, space mission needs and thermal management needs, minimizing power system contaminants and effluents while also meeting these high power requirements has been a goal not easily achieved.

A neutral particle beam accelerator system designed for target interrogation or kill requires electrical power in the multi-megawatt range at typically three distinct frequencies. A neutral particle beam accelerator is a generally elongated structure which requires that power at the three frequencies be supplied thereto at three particular input point locations spaced along the length of the accelerator.

Additionally, it is desirable that the mass of the entire space system be minimized in order to minimize the cost of launching the system into orbit. Thus, it is concomitantly desirable that the power system be very energy efficient as well as that it either produce power from a relatively low mass fuel, extract very high power levels from a larger mass fuel or utilize solar power or other power available from the environment.

The many requirements for such space-based systems typically have resulted in power systems in which there are compromises between mass penalty, cost, reliability, efficiency and power output. Consequently, what is needed is a space based power system which provides high power output, low mass penalty, high energy efficiency, high reliability and low cost.

SUMMARY OF THE INVENTION

It is a principal object of the present invention to provide a power system capable of providing high levels of power directly to separate input locations of an electrical system.

It is another object of the present invention to provide a power system capable of providing electrical power at various distinct frequencies to separate input locations of an electrical system.

It is also another object of the present invention to provide a power system having modular components in order to minimize bus length and number of interconnections.

It is also an object of the present invention to provide a power system producing minimal exhaust thrust to disturb platform attitude.

It is an object of the present invention to provide a power system producing minimal exhaust contaminants.

It is an object of the present invention to provide a power system in which the thermal management subsystem is integrated with that of an electrical system which receives the power.

It is an object of the present invention to provide a power system for an electrical system in which the thermal management subsystems of both systems utilize the working fluid of the power system as a coolant.

It is also an object of the present invention to provide a power system having improved energy efficiency.

It is also another object of the present invention to provide a power system incorporating a folding platform mount in order to enhance compactness of the system to minimize launch costs when the power system is incorporated in a launch vehicle payload.

It is still another object of the present invention to provide a power system having minimal mass in order to minimize launch costs when the power system is incorporated in a launch vehicle payload.

In order to more effectively and efficiently meet the accelerator system requirement that multi-megawatt power be provided at three distinct radio frequencies and at three different power levels, the power system of the present invention incorporates modules to provide the power directly to each of the particular inputs of the accelerator system. The modular design allows the power system to be individualized and thus more energy efficiently optimized for each of the power requirements, i.e., the three frequencies and three power levels at the three input locations, of the accelerator system. One of the modules, the turbogenerator module, in conjunction with a high voltage amplifier provides high voltage electrical power at one of the frequencies to the accelerator at one of its input points (located at an end portion thereof) under the command of the control system. Other modules provide electrical power at the other frequencies to the other input points located at a medial portion and at the other end portion of the accelerator system.

The turbogenerator module includes a turbine for converting chemical energy to mechanical energy and a generator for converting the mechanical energy to electrical energy and producing this electrical energy at high voltage, i.e., approximately 100 kilovolts, for transmission to the accelerator. The power output from the turbine generator combination, i.e., turbogenerator, is transmitted to a high voltage amplifier which produces the electrical power at the desired one-megawatt power level and within the radio frequency range of approximately 1400 to 1800 megahertz.

The power system also incorporates two other amplifiers, one for the medial frequencies and medial power levels and the other for the low frequencies and low power levels. These amplifiers are preferably modular in construction. The low frequency, low voltage amplifier receives electrical energy at approximately 100 volts from a fuel cell which converts chemical energy to electrical energy. The low voltage amplifier in combination with the fuel cell comprise the low voltage amplifier module. The low voltage amplifier of the low frequency module receives the 100 volts of electrical energy from the fuel cell and produces approximately 250 kilowatts of electrical power within the frequency range of approximately 350 to 450 megahertz. The power from this amplifier module is subsequently transmitted to the end input point which requires power at that frequency.

The other amplifier providing power at the medial frequencies and at the medial power levels receives electrical power from another turbogenerator. This amplifier provides approximately 500 kilowatts of power within the frequency range of approximately 700 to 900 megahertz to a medial input location at the accelerator.

The turbogenerator of the power module also includes a drive pulse motor which is powered by a fuel cell. The drive pulse motor is utilized to start up the turbogenerator and provide short term high voltage power required for initiation and conditioning of the accelerator. Use of this drive motor obviates both the necessity of utilizing the turbine to drive the generator during start-up and the concomitant necessity of dumping the turbogenerator power through a resistive load which wastes energy.

The modules are distributed along the neutral particle beam accelerator structure in order to reduce the length of high voltage cables thereby minimizing electromagnetic interference, providing improved control of higher voltage inductance surges, reducing electrical power distribution mass, and eliminating the need to transfer high voltage power across the joint between platform segments when a segmented platform design is utilized. In addition, the use of modules particularly the turbogenerator modules, enables the power delivered into the accelerator (or other electrical system) to be increased or decreased by simply increasing or decreasing the number of modules utilized. In addition, redundant modules can be used to provide more fail safe operation of the system.

Turbogenerators and fuel cells each have certain advantages over the other. Exclusive use of solely either one in a system having certain variant and diverse power requirements would necessitate compromises in power system features and characteristics. Therefore, the use of a hybrid power system, i.e., use of both Turbogenerators and fuel cells, to provide electrical power in accordance with the power needs, i.e., power frequencies and input locations, of the electrical system results in a more efficient, compact and lower weight power system.

The neutral particle beam accelerator system requires the use of a thermal management subsystem. The power system of the present invention utilizes an alternate cooling technique of bleeding the coolant fluid from two separate coolant outlet locations on the accelerator. This technique results in more efficient use of the coolant. The coolant fluid of the thermal management subsystem is also utilized as a working fluid to power the fuel cells and the turbogenerator. In addition, the thermal management subsystems of both the power system and the accelerator system are integrated, thereby simplifying and reducing the mass of the entire electrical and power systems. Liquid hydrogen is preferably used as the coolant for the accelerator system as well as the coolant for the power system and additionally is preferably used as the working fluid powering the fuel cells and the turbine. Since the coolant must receive some of the heat energy from the accelerator and power systems in order to function as a coolant and the working fluid powering the turbines and the fuel cells works most effectively when it contains heat energy, the coolant and the working fluid are both the same, i.e., liquid hydrogen. Thus, combining the coolant and working fluid more effectively and efficiently utilizes the thermal energy of the power and accelerator systems. Since the coolant and working fluid are hydrogen and the water effluents resulting from power production by the turbines and fuel cells are converted to hydrogen and oxygen by means of a regenerator, the only effluent and exhaust of the hybrid power system is hydrogen. This important feature of the present invention that the power system recycles fuel and working fluids and exhausts only hydrogen in relative small amounts minimizes the likelihood of contamination of the space environment which might otherwise result in adverse effects on the computer, electronics, optical or other subsystems used on the platform or on other satellites in similar orbits.

As is evident from the foregoing, the high output power system of the present invention is generally self-contained and non-contaminating. Consequently, the power system of the present invention is also applicable to any space application which requires multi-megawatts of burst power. Its efficiency as well as its non-contaminating features also enable it to be utilized in future lunar or planetary manufacturing processes that may become viable in the near future.

Combining fuel cells and turbogenerators to produce electrical power provides the important advantage of eliminating the necessity of power transformers and power conditioning assemblies. The modular configuration of the power system which places the components more proximal to the accelerator, or other electrical system which receives the power, also has the important advantage of minimizing the use of power cables and the electromagnetic interference problems they would otherwise present.

The power system of the present invention has important advantages over prior art systems. The modular design of the power system eliminates the need for costly and unreliable flex lines and connectors across platform joints that might be required for deployable platform or platform assembled on orbit. In addition, the alternate cooling technique in which coolant is bled from two separate locations at the accelerator cavities allows the coolant to be used more efficiently, thereby reducing the total amount of coolant required and therefore the total mass of the system.

DETAILED DESCRIPTION OF THE INVENTION

Referring now to the drawings, the power system of the present invention is generally designated by the numeral 10. The power system 10 provides electrical power to a neutral particle beam accelerator system generally designated by the numeral 12. The power system 10 also includes a platform 14 on which the components of the power system 10 as well as the accelerator system 12 are mounted. Although described specifically as a neutral beam accelerator system, the system 12 may also be any suitable electrical system which requires multi-megawatts of burst power input at various locations thereof. The specific features of the power system 10 which enable it to effectively and efficiently accommodate the particular multi-megawatt input locations requirements of the electrical system 12 will be described in more detail hereinbelow.

Figures 1A, 1B:
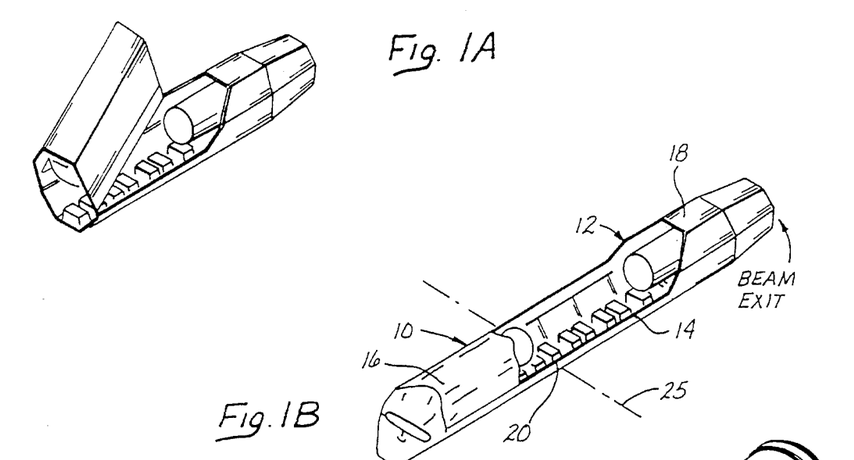
FIG. 1A is a perspective view of components of the power system of the present invention and a neutral beam accelerator system mounted on a folding platform for space-based operation illustrating the platform members in a folded together configuration.
FIG. 1B is a perspective view of components of the power system of the present invention and a neutral beam accelerator system mounted on a folding platform for space based operation illustrating the platform members in an extended configuration.
Figure 2:
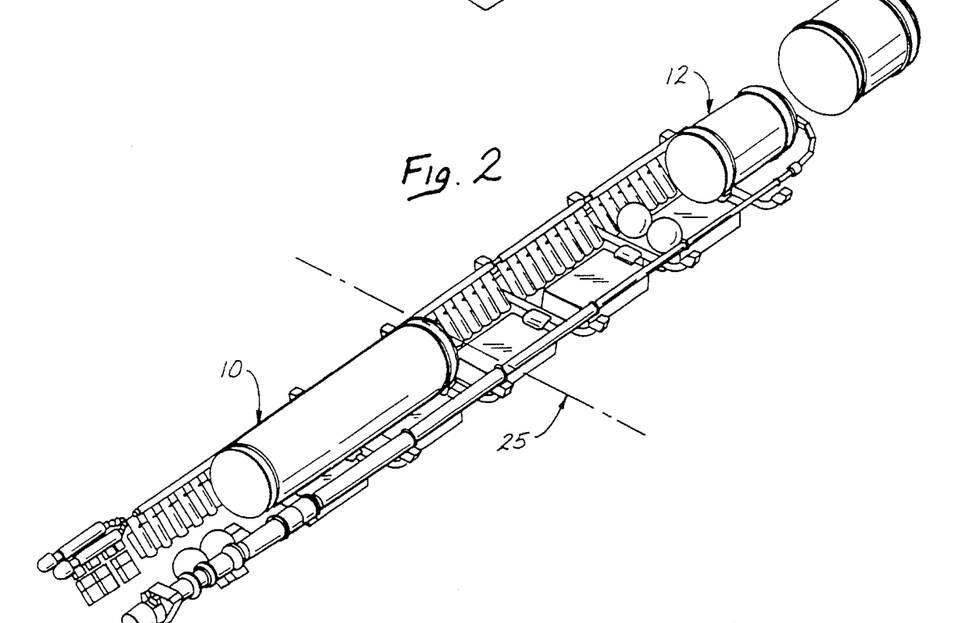
FIG. 2 is a perspective view of a representative accelerator system connected to the power system components of the present invention.
Figure 3:
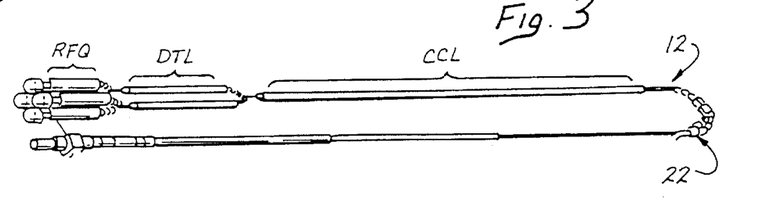
FIG. 3 is a perspective view of a representative accelerator system with which the power system of the present invention is used.
Figure 4:
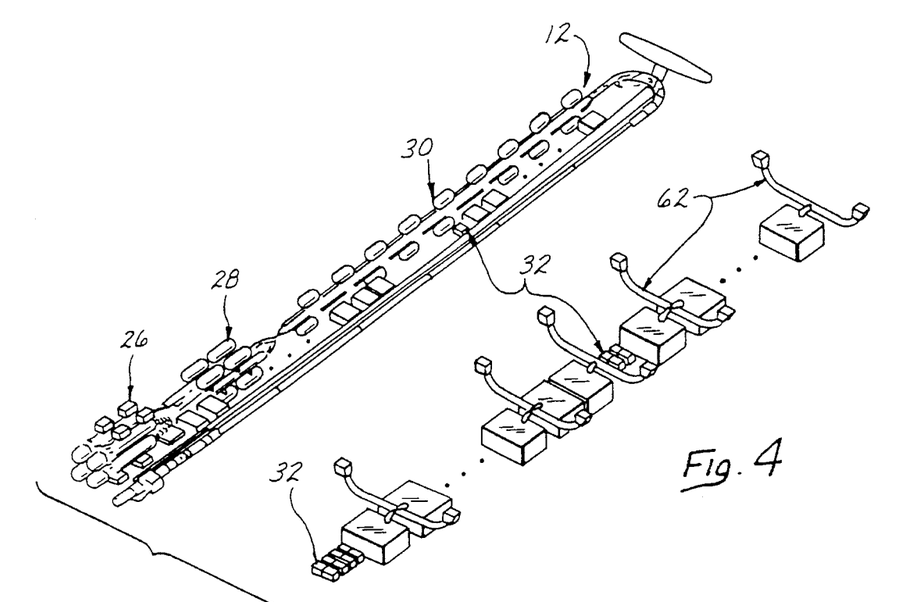
FIG. 4 is a perspective view of the accelerator system and the power system components separated therefrom for clarity of illustration. Two options for ducting the power system exhaust are illustrated: centralized and distributed.
Figure 5:
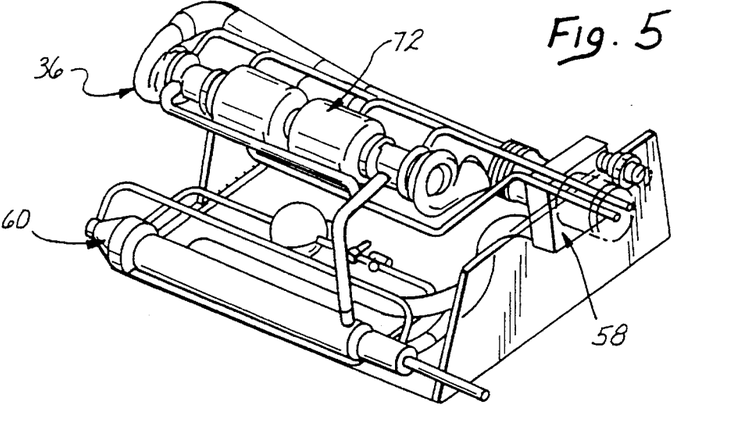
FIG. 5 is a perspective view of the turbogenerator module of the power system of the present invention showing the components thereof.
Figure 6:
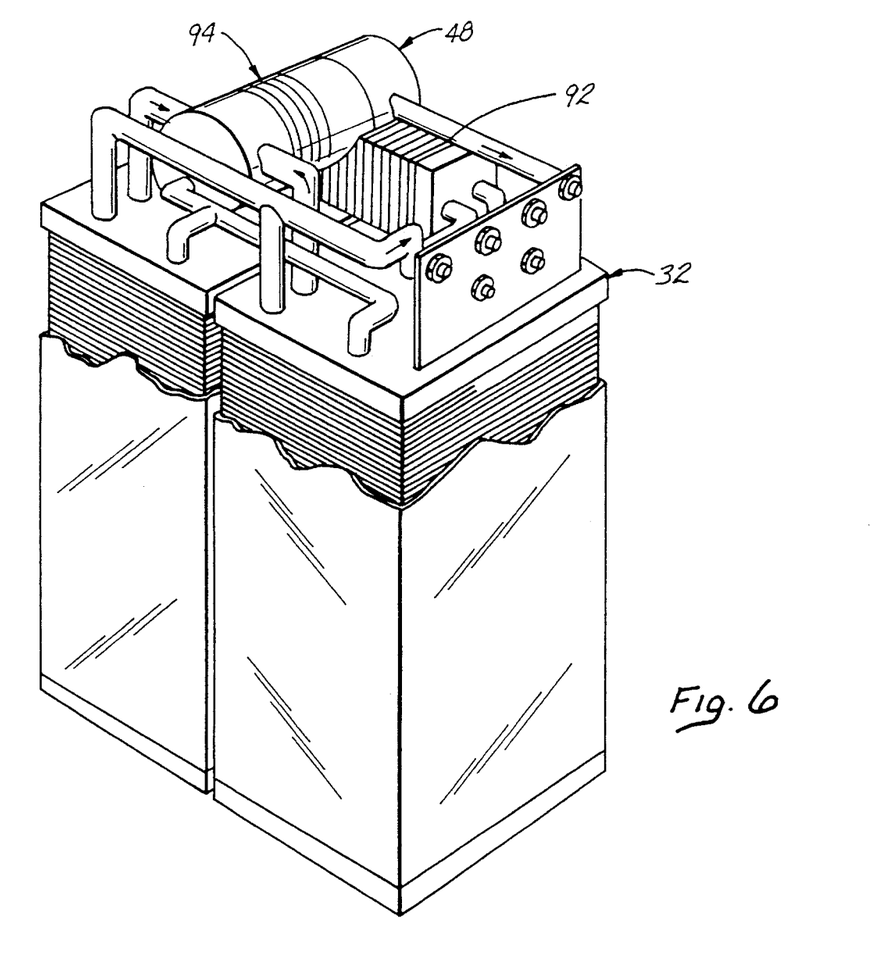
FIG. 6 is a perspective view of a representative fuel cell of the power system of the present invention.
Figure 7:
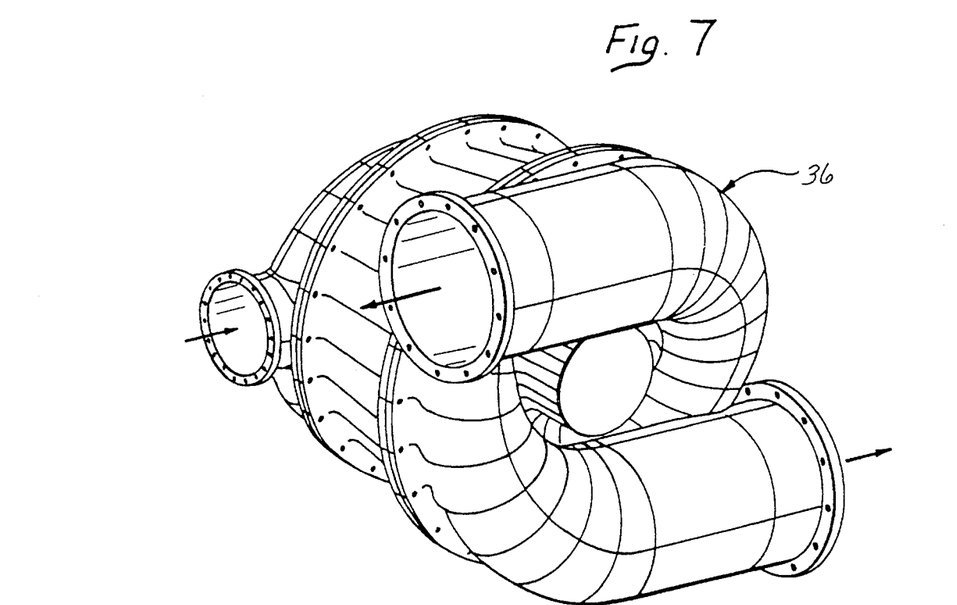
FIG. 7 is a perspective view of a representative turbine of the turbogenerator module of the power system of the present invention.
Figure 8:
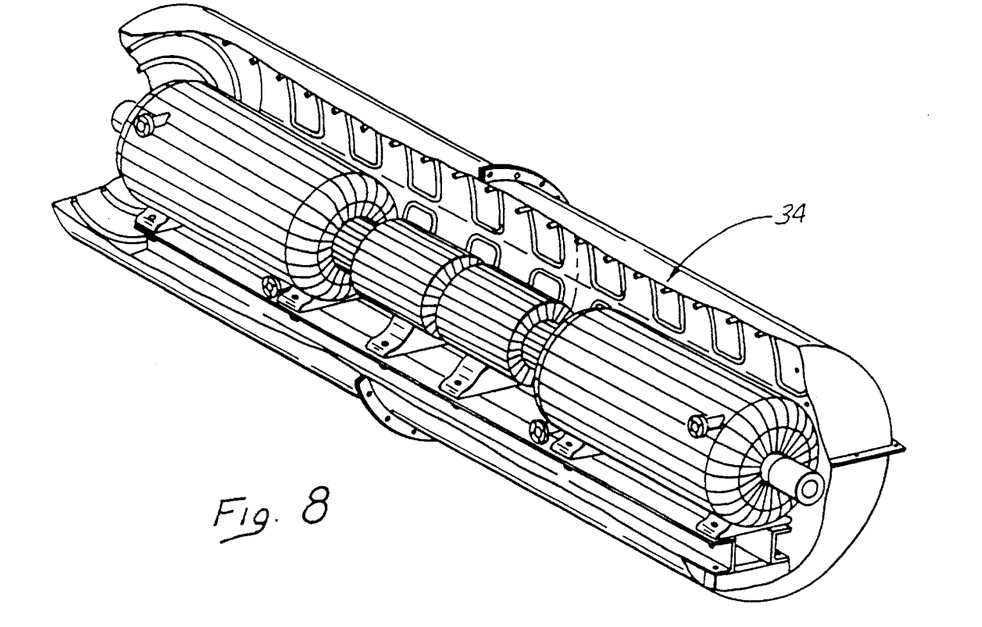
FIG. 8 is a perspective view of a pony motor/generator set of the turbogenerator module of the present invention.
Figure 9:
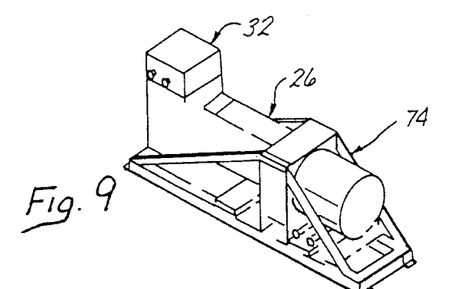
FIG. 9 is a perspective view of a representative low voltage amplifier module of the present invention.
Figure 10:
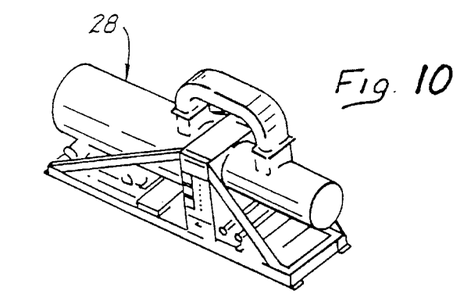
FIG. 10 is a perspective view of a representative high voltage (klystrode) amplifier of the power system of the present invention used for the medial accelerator frequency.
Figure 11:
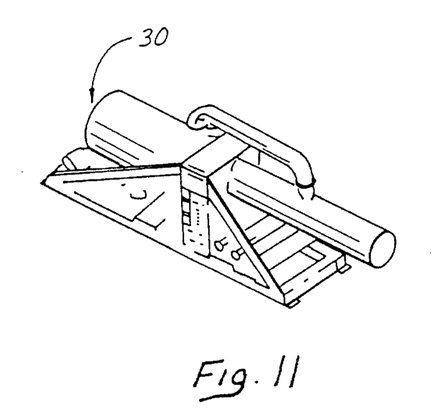
FIG. 11 is a perspective view of a representative high voltage (klystron) amplifier of the power system of the present invention used for the highest accelerator frequency.
Figure 12:
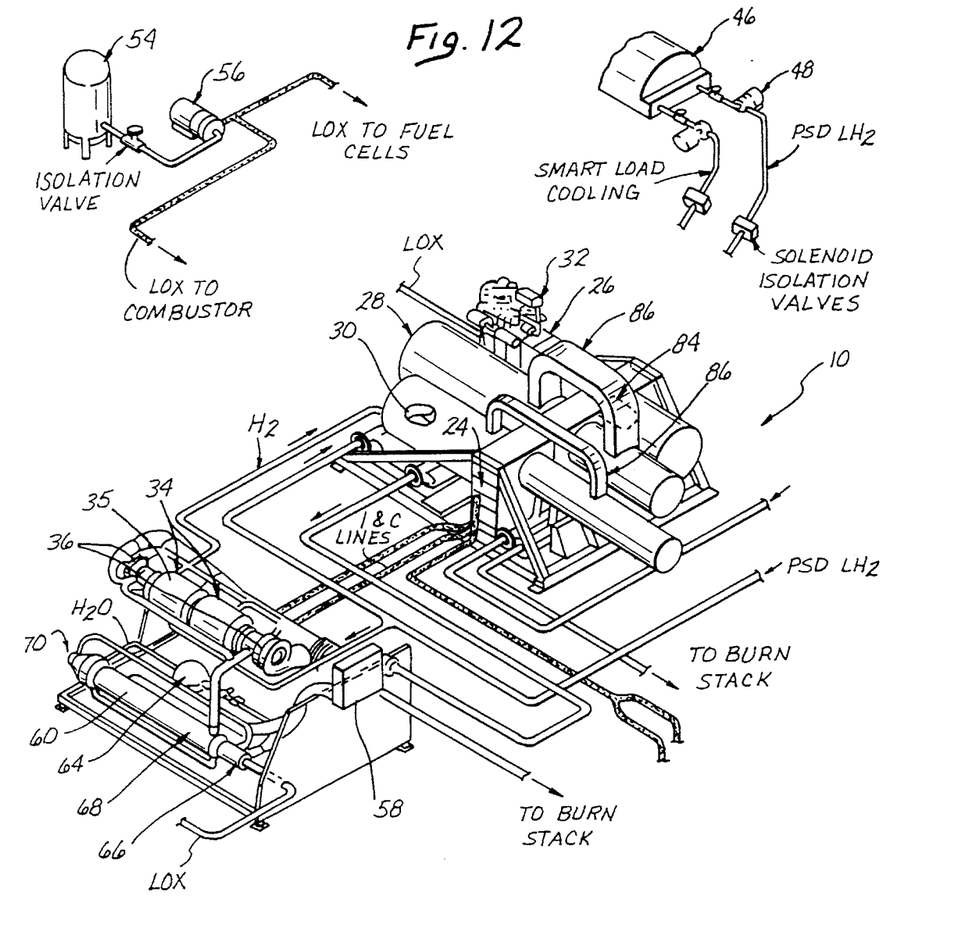
FIG. 12 is a perspective view of components of the power system of the present invention including the turbogenerator power module, the low voltage power amplifier module, the high voltage amplifiers a fuel cell, the liquid oxygen and liquid hydrogen tanks and the liquid oxygen and liquid hydrogen pumps, and illustrating the connections between these components. This configuration is used for ground acceptance of the turbogenerator module prior to its integration into the space platform for on orbit operation.
Figure 13A:
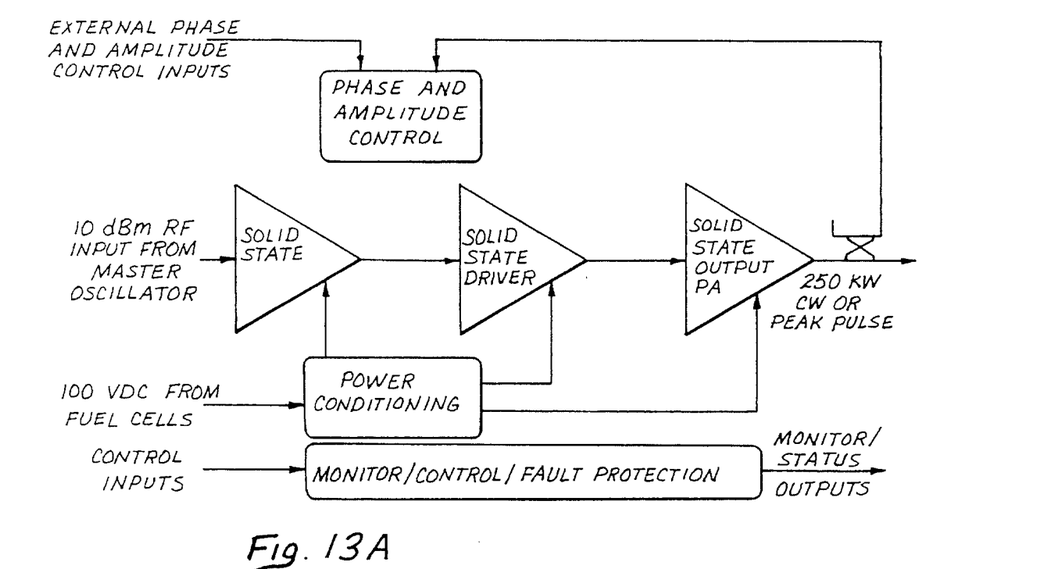
FIG. 13A is a block diagram of the low voltage amplifier of the power system of the present invention.
Figure 13B:
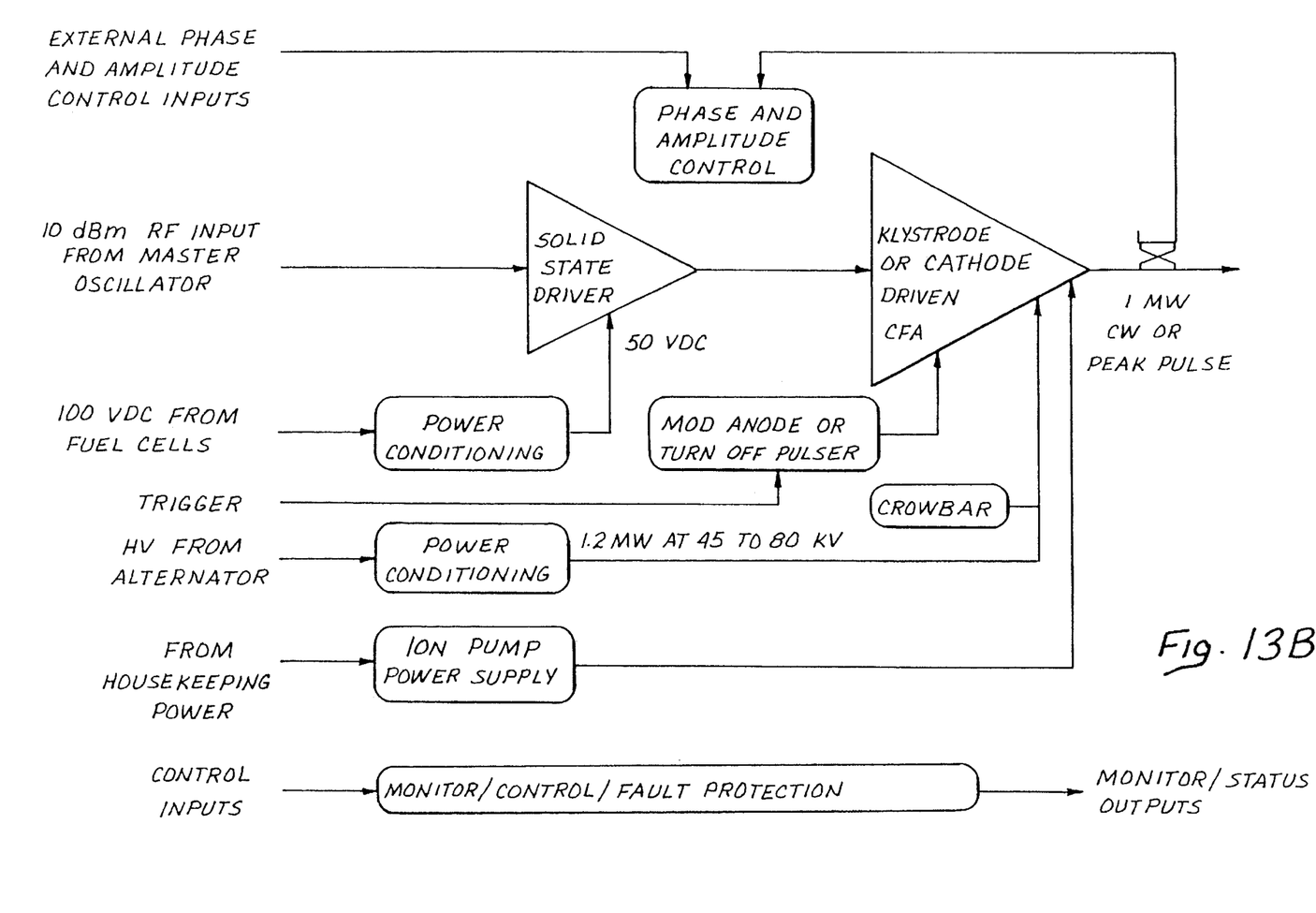
FIG. 13B is a block diagram of the high voltage amplifier of the power system of the present invention.
Figure 13C:
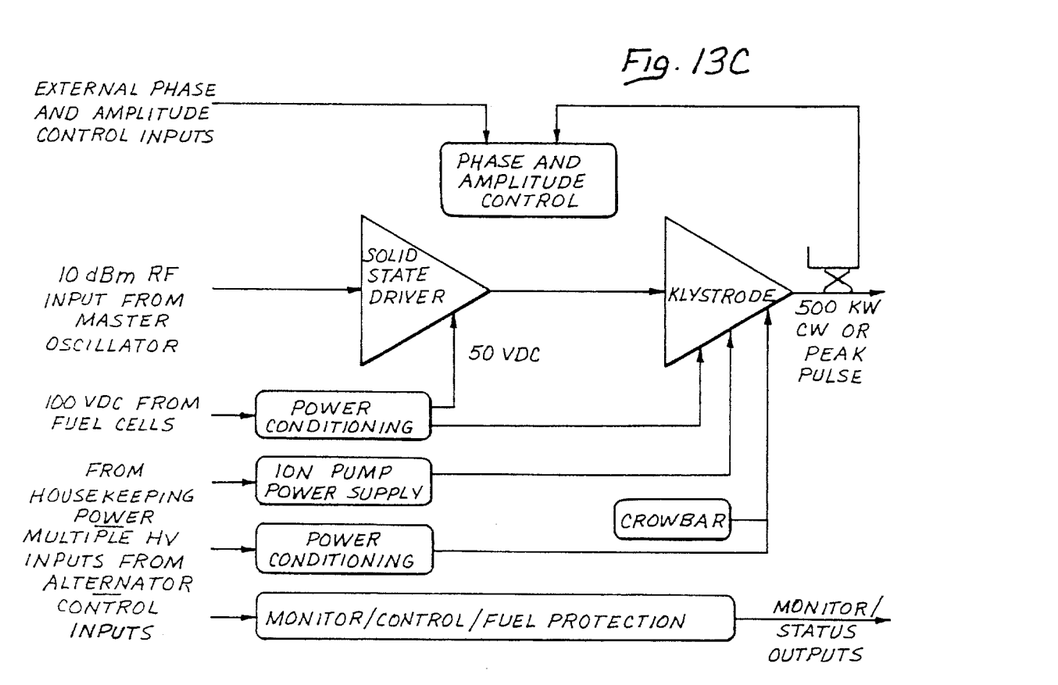
FIG. 13C is a block diagram of the medial voltage amplifier of the power system of the present invention.
Figure 14:
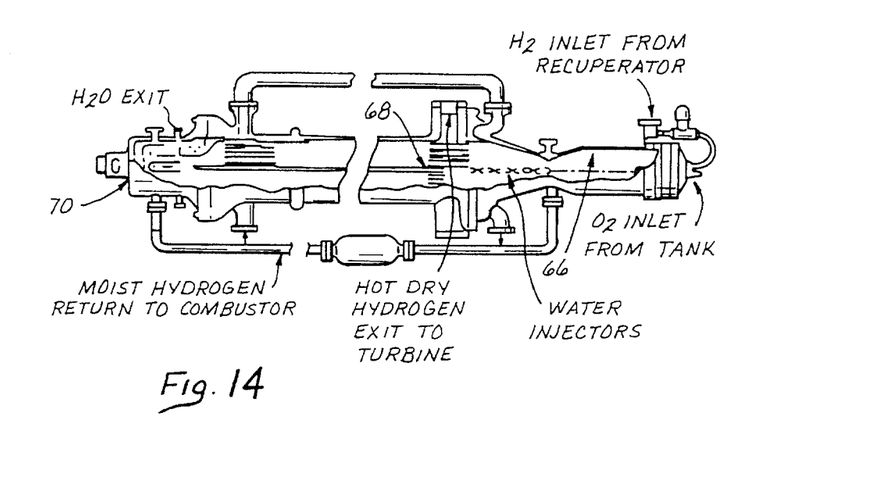
FIG. 14 is a diagram of a representative design of a thermal energy converter i.e., integrated combuster/heat exchanger/separator, of the power system of the present invention.

The platform 14 preferably includes a first member 16 and a second member 18, and a hinge joint 20 which connects the first and second members 16 and 18. The hinge joint 20 allows the members 16 and 18 to generally fold together about the hinge axis 25, thereby enabling the components of the power system 10 and the accelerator system 12 to adopt a generally more compact configuration, as shown in FIG. 1A. The compact configuration of the systems 10 and 12 enables the systems to be more easily incorporated in a missile payload and thereby facilitates a more cost effective launch and deployment of the systems 10 and 12. In addition, the compactness afforded by the folding platform 14 allows the systems 10 and 12 to be placed on a launch vehicle as a single unit rather than as two separate units launched and deployed by two separate vehicles requiring joinder or interconnection of the units in space with the attendant high costs and risks involved.

The neutral beam accelerator system 12 is a weapon specifically designed for space usage, and it requires megawatt power input at certain locations along the length of the accelerator. The accelerator 12 applies power to the neutral particles at these locations and along the beam line in order to produce effective (and optimal) acceleration thereof. The power inputs at these different locations along the length of the accelerator beam structure 22 are required to be at different frequencies and at different power levels. The required power frequency at the input point located near one end of the accelerator structure 22 is designated Fo. This frequency Fo is approximately 350 to 450 mhz. At this Fo input location, the structure 22 utilizes four radio frequency quadruples operating at this relatively low frequency. This accelerator location will be hereafter referred to as the RFQ location or first input point. At the next power input point located approximately at an intermediate point along the length of the accelerator structure 22, the megawatt power input is required to be at 2 Fo frequency (specifically approximately 700 to 900 mhz). The accelerator structure 22 utilizes preferably two drift tube linear accelerators operating at this intermediate frequency 2 Fo, and this intermediate accelerator location will hereafter be referred to as the DTL location or second input point. The power input point located at or near the other end of the accelerator structure 22 requires power input at approximately 4 Fo frequency (specifically 1400 to 1800 mhz). The accelerator structure 22 utilizes preferably one cavity coupled linear accelerator operating at this relatively high frequency 4 Fo, and this end accelerator location will be hereafter be referred to as the CCL location or third input point. The accelerator 12 requires approximately several hundred kilowatts of RF power at the Fo location, and on the order of megawatts of RF power at the 2 Fo location and at the 4 Fo location. However, the power system 10 may also be utilized with other accelerators which have other power requirements at these accelerator locations or at other locations. The power system 10 preferably provides these bursts of power as required to these specified locations along the accelerator structure 22 in accordance with commands from the instrumentation and control system 24.

Figure 15:
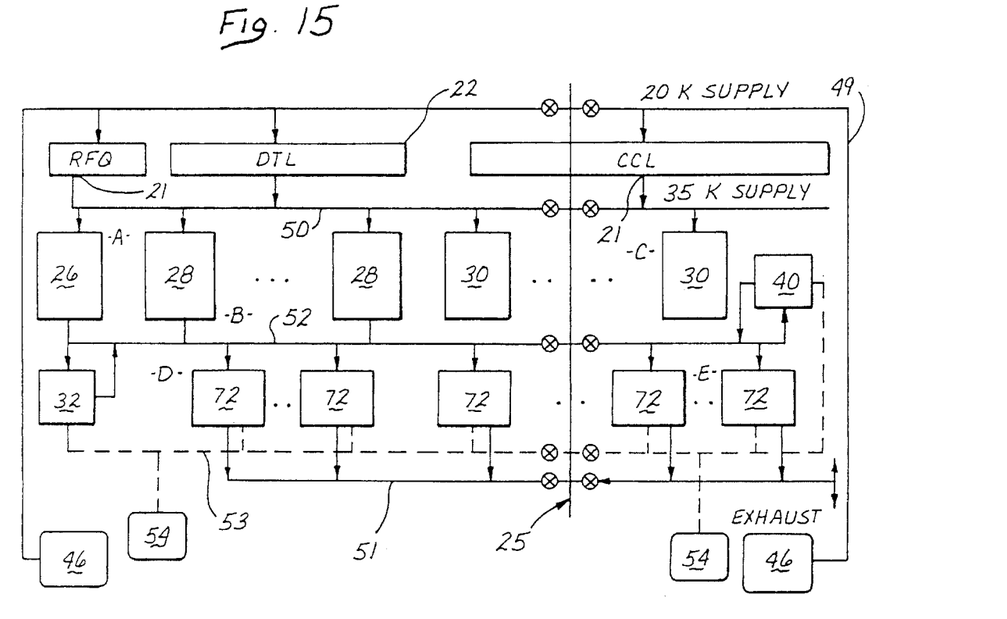
FIG. 15 is a block diagram of the accelerator system and components of the power system showing fluid and power distribution therebetween.
Figure 16:
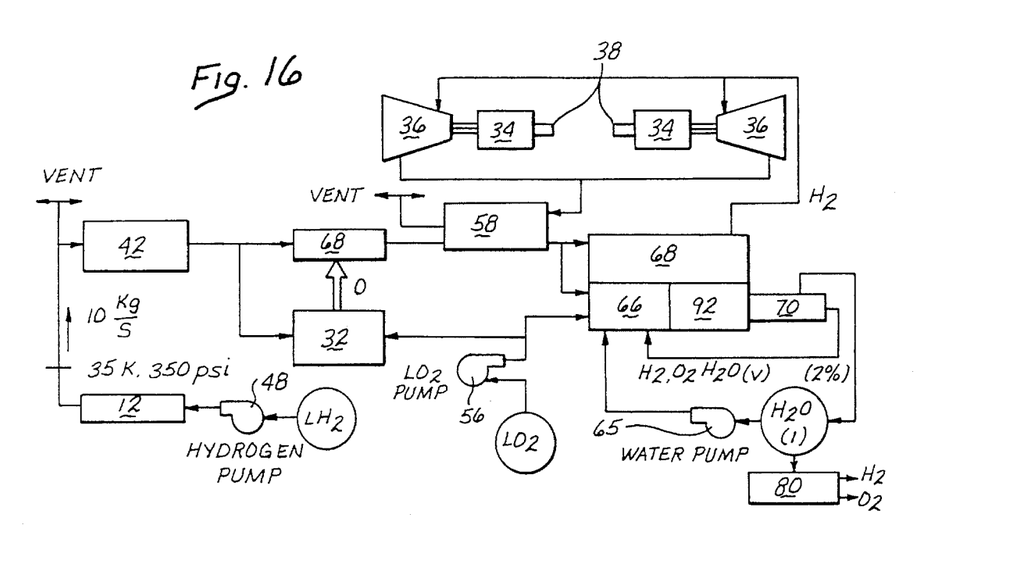
FIG. 16 is a block diagram of the thermal cycle of the integrated generation and power thermal management systems.

Because different types of amplifiers providing power at the distinct power frequencies required by the accelerator system 12 have different characteristics i.e., efficiencies, advantages and disadvantages, three different types of amplifiers are used in the power system 10. For providing power in the Fo frequency range, preferably a cryo-cooled, solid state amplifier 26 is utilized. In the 2 Fo frequency range, preferably a klystrode tube amplifier 28 is utilized. In the 4 Fo power frequency range, preferably a klystron tube amplifier 30 is utilized. There are a plurality of amplifiers 28 and a plurality of amplifiers 30, as shown in FIG. 15. A fuel cell 32 (referred to also as amplifier fuel cell 32) feeds relatively low voltage, i.e., approximately 100 volts, into the solid state amplifier 26. For the relatively higher frequencies, a generator 34, which is preferably cryo-cooled, provides relatively higher voltage, i.e., approximately 5 to 40 kilovolts, to the amps 28 and 30. The generator 34 is preferably hyperconducting with high purity aluminum windings and utilizing hydrogen coolant. Although fuel cells 32 provide power directly to the amp 26, the generator 34 which preferably comprises multiple generators 34 segregated by pairs and sized to drive discrete banks of amplifiers requires a drive system which preferably includes a pair of turbines 36 which are hydrogen driven at a pressure ratio with the hydrogen at a relatively low temperature (440 degrees K.). In order to obviate the requirement of dumping the generator 34 power into a resistive load during start-up of the turbine 36 and generator 34 (the combination will be hereafter referred to as turbogenerator 35), a pulse power drive motor 38 is provided. The drive motor (preferably a pair of motors) 38 drives the generators 34 during the start up of the turbines 36 to enable them to provide the required high voltages to the amps 28 and 30. The pulse power drive motor 38 is preferably powered by another fuel cell 40 (referred to also as turbogenerator or turbine fuel cell 40) during such start-up operations. The fuel cell (preferably a pair of cells) 40 provides power to the amps 28 and 30 during the low duty portion of the start up sequence.

The thermal management requirements of both systems 10 and 12 are preferably provided by a single thermal management system 42, thereby simplifying and reducing the number of thermal management structures utilized in the systems 10 and 12. The coolant 44 utilized by the accelerator system 12 is preferably liquid hydrogen. Similarly, the coolant 44 utilized by the system 10 is preferably supercritical hydrogen. The liquid hydrogen is preferably stored in liquid form in a storage tank 46 and circulated through the systems 10 and 12 by a hydrogen pump 48. The hydrogen fluid distribution through system 10 is shown in FIG. 15. The pump 48 preferably delivers liquid hydrogen to the accelerator structure 22 for cooling thereof and this liquid hydrogen is bled from the cavities of the accelerator structure 22 at two different outlet locations 21 thereof (preferably at two approximately end portions of the accelerator 22) in order to provide more efficient cooling of the accelerator structure 22. The liquid hydrogen coolant 44 is preferably pumped by pump 48 via a set of conduits 49 into the accelerator structure 22 at preferably a temperature of approximately 20 degrees K. In the accelerator structure 22 it is heated to approximately 35 degrees K. and sustains an approximately 700 kPA pressure drop. From the accelerator structure 22, supercritical hydrogen is transmitted through a set of conduits 50 to the Fo, 2 Fo and 4 Fo amplifiers. From these amplifiers, the hydrogen is transmitted to the fuel cells 32 and 40 and the turbogenerator module 72 via conduits 52. The hydrogen effluent from the turbogenerator modules 72 is exhausted from systems 10 and 12 via conduits 51. Liquid oxygen is transmitted to turbogenerator modules 72 and fuel cells 32 and 40 via conduit 53. Since the use of the hydrogen as a coolant through these various components of the systems 10 and 12 increases the temperature of the hydrogen, the energy of the hydrogen is thereby increased making it more effective as a working fluid and as a fuel. Therefore, after the hydrogen performs its cooling function, it is utilized as a fuel by the fuel cells and as a working fluid by the turbines. In addition, since the hydrogen coolant from the fuel cells 32 and 40 is heated hydrogen, it is preferably mixed with the hydrogen flowing in duct 52.

The turbine 36 preferably receives hydrogen from the amplifiers 26, 28 and 30 via the conduits 52 and receives liquid oxygen from the storage tank 54 which is pumped from the turbine by means of the oxygen pump 56. The turbine transmits the dry hydrogen through a recuperator 58 and the liquid oxygen to a thermal energy converter 60. The recuperator both improves efficiency and prevents freezing of the hydrogen inside the converter 60. Dry hot hydrogen exits the converter 60 and is expanded through the turbine 36. The dry turbine exhaust subsequently passes through the recuperator 58 and is vented to the exhaust manifold 62 which extends the length of the platform 14. Water from the converter 60 is pumped to the water storage tanks 64. The thermal energy converter 60 preferably includes a combuster 66, a heat exchanger 68 and a separator 70 which are preferably integrated. The converter 60 channels a small amount of the dry hydrogen stream from the turbine 36 into the stoichiometric hydrogen and oxygen combuster 66. Water injection is preferably utilized to control the combustion temperature to levels acceptable for the heat exchanger 68 and the turbine 36. The hot steam produced by the combustor 66 is condensed in the counterflow heat exchanger 68 and the heat is transferred to the remaining dry hydrogen stream in the heat exchanger 68. The water and non-condensable combustion products subsequently enter the centrifugal separator where any non-condensables are separated out and returned to the combustor 66. The generator 34, turbine 36, drive motor 38, turbine fuel cell 40, combuster 66, heat exchanger 68, separator 70 and recuperator 58 preferably comprise turbogenerator module 72. Although there are preferably four to six turbogenerator modules 72, this number may be increased or decreased in accordance with the power requirements of the particular electrical system 12 which receives electrical power from the power system 10. Although there is preferably only one low voltage amplifier module 74, there may be more than this number to accommodate higher power requirements of the particular electrical system 12 with which the system 10 is used. This allows the power system 10 to be used with various electrical systems by simply changing the number of modules.

A pair of oxygen tanks 54 are preferably provided. One of the tanks 54 is mounted on each of the platform members 16 and 18, thereby eliminating the need for flexible cryogenic lines to cross the hinge axis line.

Fuel cells 40 preferably also provide power to the solid state drivers 78 of the amplifiers 28 and 30. Alternatively, other separate fuel cells may be used which are also powered by hydrogen coolant, as with fuel cells 32 and 40.

Water generated by the combustion process of the fuel cells 32 and 40 and the turbogenerator modules 72 (specifically, the combustor 66) is preferably transmitted to and electrolyzed in a regenerator 80 which is preferably a regenerative fuel cell. A housekeeping power source 82 preferably provides the power for the regenerator 80. The housekeeping power source 82 is preferably a nuclear power unit or a solar power unit providing relatively low levels of power during the very long dormant periods of the turbogenerator modules 72 and fuel cells 32 and 40.

Coaxial cables 84 preferably provide power from the amplifier 26 to the RFQ portion of the accelerator structure 22. Similarly, wave guides 86 preferably transmit power from the amplifiers 28 and 30 to the DTL and CCL portions of the accelerator structure 22.

The thermal management system 32 preferably includes the recuperator 58, a radiator 90 connected to the housekeeping power source 82, a condenser 92 connected to the combustor 66 and the fuel cells 32 and 40, a preheater 94 connected to the coolant pump 48 and the heat exchangers 68. The condenser 92 is preferably integrated with the heat exchanger 68.

Figure 17:
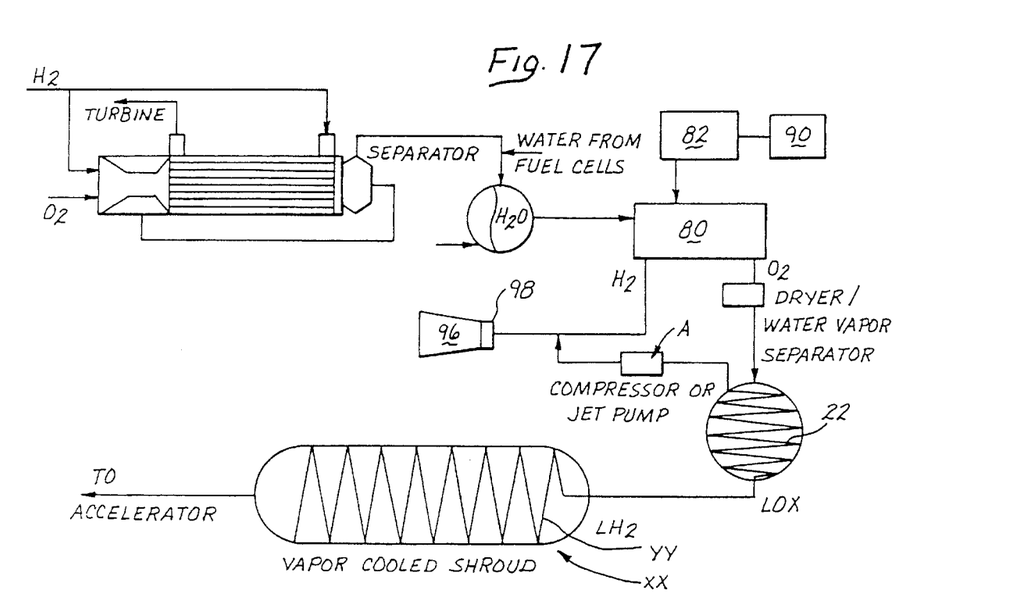
FIG. 17 is a block diagram of components of the oxygen recovery system of the present invention as well as the integrated thermal management subsystem and propulsion subsystem used for on orbit station keeping and illustrating their interconnections.

A small propulsive nozzle 96 is preferably provided which utilizes the hydrogen produced from the electrolyzer 80 to provide thrust, i.e., propulsion, to the platform 14 in order to offset drag and thereby maintain orbit. Hydrogen boil off from tank XX, FIG. 17, is used in a vapor cooled shroud YY to minimize the thermal input to the liquid hydrogen. Hydrogen exiting the vapor cooled shroud is transmitted to a vapor cooled shroud 22 on the liquid oxygen tank. This provides cooling to the oxygen tank and minimizes oxygen boil off. The hydrogen exits the oxygen tank vapor shroud and is compressed via a small compressor or jet pump assembly A to the pressure of the hydrogen entering the propulsive nozzle 96 and mixed with the hydrogen exiting the electrolyzer unit. Multiple thrust nozzles are placed around the platform to provide station keeping thrust. In addition, during burst power testing of the system 12, exhaust is preferably vented in an amount and direction selected to provide the desired thrust to the platform 14 by a suitable exhaust nozzle (or outlet) control 98. These propulsion structures thus enable effective use of effluent which would otherwise be wasted, thereby making the power system 10 generally more energy-efficient.

Accordingly, there has been provided, in accordance with the invention, a system for providing electrical power to selected input locations of an accelerator or other electrical system at megawatt power levels and at various frequencies. It is to be understood that all the terms used herein are descriptive rather than limiting. Although the invention has been described in conjunction with the specific embodiment set forth above, many alternative embodiments, modifications and variations will be apparent to those skilled in the art in light of the disclosure set forth herein. Accordingly, it is intended to include all such alternative embodiments, modifications and variations that fall within the spirit and scope of the invention as set forth in the claims hereinbelow.

We claim:

1. A power system, comprising:

a turbogenerator system;

a low voltage amplifier;

an amplifier fuel cell connected to said low voltage amplifier for supplying electrical power thereto;

a medium voltage amplifier connected to said turbogenerator system for receiving high voltage electrical power therefrom; and a high voltage amplifier connected to said turbogenerator system for receiving high voltage electrical power therefrom, said high, medium and low voltage amplifiers supplying electrical power at selected radio frequencies to an electrical system.

2. The power system of claim 1, and further comprising a thermal management subsystem for circulating coolant through said turbogenerator system and said amplifiers.

3. The power system of claim 2, wherein said coolant comprises hydrogen fluid, the fluid first circulating through said turbogenerator system and said amplifiers and then flowing to said amplifier fuel cell for use as a fuel.

4. The power system of claim 1, wherein said turbogenerator system and said fuel cell each produce water effluent, said system further comprising a regenerator tier treating said water effluent to separate hydrogen and water therefrom.

5. The power system of claim 4, and further comprising a propulsion motor which is operably connected to said regenerator, said propulsion motor being adapted to receive hydrogen from the regenerator for use as a fuel to operate and provide propulsion to said power system.

6. The power system of claim 1, and further comprising a platform, said platform including a first member, a second member, and a hinge joint for attaching said first and second members, the hinge joint being adapted to permit said first and second members to fold together for providing compactness to the power system.

7. The power system of claim 6, wherein said platform is arranged so that no fluid or power lines extend across said hinge joint.

8. The power system of claim 1, wherein said turbogenerator system and said fuel cell each produce water effluent, and further including a means for directing and controlling said water effluent to provide propulsion to said power system.

9. The power system of claim 1, and further comprising:

a drive motor operatively connected to said turbogenerator system for driving said turbogenerator system during start up thereof so that said turbogenerator system can provide high voltage electrical output during said start up; and a turbogenerator fuel cell operatively connected to said drive motor for powering said drive motor during the start up of said turbogenerator system.

10. The power system of claim 1, wherein the turbogenerator system further comprises a plurality of turbogenerator modules, said modules being distributed at various locations within said power system for providing power from various points thereof.

11. A power system comprising:

a plurality of turbogenerator modules for supplying electrical power to separate input points of an electrical system;

a high voltage amplifier being adapted for receiving power from one of said turbogenerator modules, said voltage amplifier supplying electrical power to a first of the input points of the electrical system;

a medium voltage amplifier being adapted to receive power from another of said turbogenerator modules, said medium voltage amplifier supplying electrical power to a second of the input points; and a low voltage amplifier module for supplying electrical power to a third of the selected input points of the electrical system.

12. The power system of claim 11, wherein said low voltage amplifier module includes:

a low voltage amplifier; and an amplifier fuel cell connected to said low voltage amplifier for supplying power thereto.

13. The power system of claim 11, and further including a thermal management subsystem for cooling the electrical system, said turbogenerator modules, said amplifiers and said low voltage amplifier module.

14. The power system of claim 13, wherein said thermal management subsystem includes:

a first set of conduits for supplying coolant to the electrical system;

a second set of conduits for transmitting the coolant from the electrical system to said high voltage amplifier and to said low voltage amplifier module; and a third set of conduits for transmitting the coolant from said high voltage amplifier to said turbogenerator modules.

15. The power system of claim 11, wherein said electrical system comprises a neutron accelerator system.

16. The power system of claim 15, wherein said accelerator system comprises:

a low frequency power input location;

a mid frequency power input location; and a high frequency power input location; and wherein said low voltage amplifier supplies power to said low frequency power input location, said medium voltage amplifier supplies power to said mid frequency power input location; and said high voltage amplifier supplies power to said high frequency power input location.

* * * * *